United States Patent Office 2,715,102
Patented Aug. 9, 1955

2,715,102

META- AND PARA-PHENYLENE DIAMINES AS POLYMERIZATION INHIBITORS FOR DIACETYLENE

Herbert H. Nelson, Dickinson, Tex., assignor to Monsanto Chemical Company, St. Louis, Mo., a corporation of Delaware No Drawing. Application November 12, 1953, Serial No. 391,756

4 Claims. (Cl. 252—1)

This invention relates to the inhibition of polymerization. In one embodiment, it pertains to the inhibition of undesirable polymer growth in processing equipment. Specifically, it is concerned with a method for the stabilization of diactylene or of mixtures containing diacetylene against polymerization and the stabilized compositions so produced.

If acetylene is produced from hydrocarbons, e. g., by the well known electric arc process or by thermal decomposition or dissociation, the acetylene-containing gas mixture produced generally contains diacetylene as well, in amounts ranging from as little as 0.05% to as much as 5%. The purification of such an acetylenic gas mixture is usually accomplished by the selective action of suitable solvents. A great number and variety of solvents have been proposed and are effectively employed in well-developed purification processes. However, in these conventional methods of absorption and stripping, the gas mixture is subjected to conditions of temperature and pressure under which some of the diacetylene present polymerizes, and provision must be made in all such processes for periodic removal of the diacetylene polymers to prevent their excessive build-up in the solvent in the absorption step. This requires additional, specialized filtration equipment as well as added process steps which are costly with regard to both time and capital expense. Frequently, too, the diacetylene polymer collects in the less accessible parts of the system, fouling up equipment lines, columns, and the like. Usually, this particular polymer is of such a small particle size that it plugs the filter used for separating it, so that only a small amount can be filtered in each operation and an inordinate length of time is required to wring the filter cake dry.

Methods have been proposed for removal of diacetylene from the gas stream, but these are cumbersome and expensive since they require additional process steps prior to the usual solvent purification operation which utilizes special equipment and significant quantities of special chemicals for treating purposes.

It is an object of the present invention, therefore, to provide a method whereby undesirable polymer growth in the solvent purification of acetylene is inhibited.

It is a further object of the invention to provide a method for stabilization of diacetylene against polymerization.

It is a still further object of the invention to provide novel stabilized compositions comprising diacetylene, a solvent therefor, and an added polymerization inhibitor which do not polymerize when subjected to conditions under which such compositions lacking the inhibitor polymerize readily and rapidly.

Other objects and advantages of the invention will be apparent from the following description and the appended claims.

According to the invention, diacetylene contained in a solvent is stabilized against polymerization by the addition thereto of small quantities of meta-phenylene diamine, p-phenylene diamine, or the hydrochlorides of these compounds. The composition comprising diacetylene, a solvent therefor, and a minor amount of either meta-phenylene diamine, p-phenylene diamine, or the hydrochlorides of these aryl diamines will not exhibit any significant polymer formation on storage or when subjected to the temperatures ordinarily encountered in solvent purification systems for acetylene purification.

The following examples illustrate the invention but are not to be construed as limiting it in any manner.

EXAMPLE I

Diacetylene was generated by dropping 40% sodium hydroxide into a well-stirred solution of 1,4-dichlorobutyne in ethanol at a temperature of approximately 75° C. The product gas was passed through Dry Ice traps and then allowed to bubble through a fritted gas bubbler into technical-grade butyrolacetone at room temperature to make a stock solution of 0.3 g. of diacetylene per milliliter of solution. In the polymerization tests, 20 ml. of a test mixture containing a known amount of the diacetylene stock solution, butyrolactone, water, and a weighed amount of the inhibitor were introduced into a thick-walled test tube. The mixture was frozen and the end of the test tube was drawn off in a torch flame to make a sealed ampoule. The sealed ampoules were wrapped in bronze screen and placed in an oven maintained at 125° C. for 16 hours, after which they were removed and inspected for polymer content. Blanks were run in which only a butyrolactone-water mixture and mixtures of butyrolactone, water and diacetylene were present. Results of a series of such tests are presented in Table I.

Table I

| Test No. | Test Mixture | Condition of Test Mixture |
|---|---|---|
| 1 | 50% BL*–50% H₂O. | Usual straw color; perfectly clear; unchanged. |
| 2 | Same as in Test No. 1 above, plus 1% p-phenylene diamine. | Dark red-wine colored solution. Small amount finely divided black ppt. on surface. |
| 3 | 50% BL*–50% H₂O plus 0.25% diacetylene. | Reddish brown suspension of plymer; fairly heavy ppt. of finely divided material. |
| 4 | Same as in Test No. 3 above, plus 0.01% p-phenylene diamine. | Dark wine colored solution; no visible ppt. |
| 5 | Same as in Test No. 3 above, plus 0.05% p-phenylene diamine. | Same as Test No. 4 above; slightly darker color. |
| 6 | Same as in Test No. 3 above, plus 0.1% p-phenylene diamine. | Dark wine colored solution; no visible ppt. |
| 7 | Same as in Test No. 3 above, plus 1.0% p-phenylene diamine. | Deep red-wine colored solution; no ppt., but thin transparent film on surface, of liquid. |

*Butyrolactone.

EXAMPLE II

A second series of tests were conducted following the same procedures described in Example I using m-phenylene diamine dihydrochloride as the inhibitor. Results of such tests are presented in Table II.

*Table II*

| Test No. | Test Mixture | Condition of Test Mixture |
|---|---|---|
| 1 | 50% B L*-50% H₂O. | Usual straw color; perfectly clear; unchanged. |
| 2 | Same as in Test No. 1 above plus 1% m-phenylene diamine dihydrochloride. | Clear, medium red-wine color; no ppt. Dark green fluorescence noticeable. |
| 3 | 50% B L*-50% H₂O plus 0.25% diacetylene. | Reddish brown suspension of polymer; fairly heavy ppt. of finely divided material. |
| 4 | Same as in Test No. 3 above plus 0.01% m-phenylene diamine dihydrochloride. | Deep red-wine color; clear; no precipitate. |
| 5 | Same as in Test No. 3 above plus 0.01% m-phenylene diamine dihydrochloride. | Deep red-wine color; no ppt., dark green fluorescence. |
| 6 | Same as in Test No. 3 above plus 1.0% m-phenylene diamine dihydrochloride. | Deep red-wine color; clear; no ppt.; dark green fluorescence noted. |
| 7 | 50% B L*-50% H₂O plus 0.5% diacetylene. | Rich red-brown heavy suspension; heavy, finely divided ppt. settled out. |
| 8 | Same as in Test No. 7 above plus 0.01% m-phenylene diamine dihydrochloride. | Very dark red-wine color; no visible ppt.; some film on liquid surface. |
| 9 | Same as in Test No. 7 above plus 0.1% m-phenylene diamine dihydrochloride. | Clear, deep red-wine color; green fluorescence; no visible ppt. |
| 10 | Same as in Test No. 7 above plus 0.5% m-phenylene diamine dihydrochloride. | Clear, deep red-wine color with strong green fluorescence; no ppt. at all. |

*Butyrolactone.

EXAMPLE III m-Phenylene diamine was also tested as an inhibitor by the same procedure described in Example I. Results of these polymerization tests are recorded in Table III.

*Table III*

| Test No. | Test Mixture | Condition of Test Mixture |
|---|---|---|
| 1 | 50% B L*-50% H₂O. | Usual straw color; perfectly clear; unchanged. |
| 2 | Same as in Test No. 1 above plus 0.5% m-phenylene diamine. | Dark amber color with extremely strong green fluorescence. |
| 3 | 50% B L*-50% H₂O plus 0.25% diacetylene. | Reddish brown suspension of polymer; fairly heavy ppt. of finely divided material. |
| 4 | Same as in Test No. 3 above plus 0.01% m-phenylene diamine. | Medium-dark amber color; extremely dark green fluorescence; no ppt. |
| 5 | Same as in Test No. 3 above plus 0.1% m-phenylene diamine. | Do. |
| 6 | Same as in Test No. 3 above plus 0.5% m-phenylene diamine. | Do. |

*Butyrolactone.

EXAMPLE IV

The testing procedures described in Example I were again repeated using p-phenylene diamine dihydrochloride as the polymerization inhibitor. Results with this compound are described in Table IV.

*Table IV*

| Test No. | Test Mixture | Condition of Test Mixture |
|---|---|---|
| 1 | 50% B L*-50% H₂O. | Usual straw color; perfectly clear; unchanged. |
| 2 | Same as in Test No. 1 above plus 0.5% p-phenylene diamine dihydrochloride. | Medium-dark amber color with extremely strong green fluorescence; perfectly clear; no film or ppt. |
| 3 | 50% B L*-50% H₂O plus 0.25% diacetylene. | Reddish brown suspension of polymer; fairly heavy ppt. of finely divided material. |
| 4 | Same as in Test No. 3 above plus 0.01% p-phenylene diamine dihydrochloride. | Medium-dark amber color with extremely strong green fluorescence; perfectly clear; no film or ppt. |
| 5 | Same as in Test No. 3 above plus 0.1% p-phenylene diamine dihydrochloride. | Do. |
| 6 | Same as in Test No. 3 above plus 0.5% p-phenylene diamine dihydrochloride. | Do. |

*Butyrolactone.

It will be seen from the qualitative data presented in the above tables, that polymerization of diacetylene is effectively inhibited in the presence of very small quantities, as little as 0.01% in some instances, of the m- and p-phenylene diamines and their hydrochlorides.

While the preceding examples have illustrated a specific embodiment of the invention, substantial variations may be made without departing from the scope thereof. For example, the quantity of the aryl diamines and/or their hydrochlorides used to inhibit the polymerization of diacetylene can be varied widely, although the amount used depends somewhat on the amount of diacetylene present and the degree of inhibition desired. In general, only minor quantities of the inhibitor are required. Concentrations in the range of about 0.01% to about 5% by weight of the total composition are suitable, with concentrations from about 0.1% to about 1% being preferred. The stabilizing agent may, of course, be employed in as great a concentration as desired.

The inhibitor of the invention is not restricted to use with butyrolactone as set out in the examples above. Aryl diamines and/or their hydrochlorides may be used to inhibit the polymerization of diacetylene in other like organic solvents. In solvent systems where such solvents are used to absorb acetylene from a gas stream containing it in combination with other gases including diacetylene, polymerization of the diacetylene is effectively inhibited by the presence of a minor amount of the aryl diamines and/or their hydrochlorides. To inhibit polymer formation during the absorption-stripping operation, the inhibitor can be added directly to the solvent feed stream, or it may be introduced as a solution of the desired concentration at some point in the absorption system. The inhibiting power of the aryl diamines and/or their hydrochlorides is not affected by continual reuse; hence, recirculation of the solvent provides as effective inhibition as the introduction of the fresh solution.

The inhibitor of the invention may also be utilized for preparing stabilized compositions of diacetylene in a solvent which can be safely stored over a period of time without undergoing polymerization with its usual attendant hazards.

The term "consisting essentially of" which appears in the claims hereof is intended to refer to a composition in which the total amounts of the components set forth in the claims constitutes the predominant proportion in the presence of materials such as moisture or water or other composition. Such term is not intended to exclude the material which may be present as an inert diluent and does not adversely affect the solution in any manner. However, the term is intended to exclude the presence of materials which so change the character of the composition that it can no longer be regarded as a solution of diacetylene.

What is claimed is:

1. A composition of matter consisting essentially of diacetylene, a solvent therefor, and a compound selected from the group consisting of the meta- and para-phenylene diamines and their hydrochlorides in an amount from about 0.01% to about 5% by weight of the total composition.

2. A composition of matter consisting essentially of diacetylene, a solvent therefor, and a compound selected from the group consisting of the meta- and para-phenylene diamines and their hydrochlorides in an amount from about 0.1% to about 1% by weight of the total composition.

3. A composition of matter consisting essentially of diacetylene, a solvent selected from the group consisting of the meta- and para-phenylene diamines and their hydrochlorides in an amount from about 0.01% to about 5% by weight of the total composition.

4. A composition of matter consisting essentially of diacetylene, butyrolactone, and a compound selected from the class consisting of the meta- and para-phenylene diamines and their hydrochlorides in an amount from about 0.1% to about 1.0% by weight of the total composition.

References Cited in the file of this patent

UNITED STATES PATENTS

| | | |
|---|---|---|
| 2,601,673 | McMillan et al. | June 24, 1952 |
| 2,629,708 | Uraneck et al. | Feb. 24, 1953 |
| 2,629,709 | Uraneck et al. | Feb. 24, 1953 |